US005650869A

United States Patent [19]
Manhart et al.

[11] Patent Number: 5,650,869
[45] Date of Patent: Jul. 22, 1997

[54] POINT RELAY SCANNER UTILIZING ELLIPSOIDAL MIRRORS

[75] Inventors: Paul K. Manhart; Robert J. Pagano, both of Tucson, Ariz.

[73] Assignee: The United States of America as represented by the Administrator of the National Aeronautics and Space Administration, Washington, D.C.

[21] Appl. No.: 435,400

[22] Filed: May 5, 1995

[51] Int. Cl.$^6$ .................................................. G02B 26/08
[52] U.S. Cl. .......................... 359/203; 359/201; 359/214; 359/216; 359/631; 359/855; 359/900
[58] Field of Search ...................... 359/208, 212, 359/201–203, 216, 850, 855, 872, 851, 853, 864, 866, 868–869, 630–633, 214, 900; 250/234–236

[56] References Cited

U.S. PATENT DOCUMENTS

| | | |
|---|---|---|
| 2,855,521 | 10/1958 | Blackstone ............................. 358/481 |
| 3,619,039 | 11/1971 | Beiser .................................... 359/216 |
| 3,970,359 | 7/1976 | Starkweather ......................... 250/236 |
| 4,268,110 | 5/1981 | Ford . | 
| 4,624,528 | 11/1986 | Brueggemann . |
| 4,682,842 | 7/1987 | Brueggemann . |
| 4,814,630 | 3/1989 | Lim ...................................... 250/208.3 |
| 4,820,911 | 4/1989 | Arackellian et al. .................. 359/216 |
| 4,875,748 | 10/1989 | Matsumoto et al. .................. 359/216 |
| 4,971,410 | 11/1990 | Wike, Jr. et al. ..................... 359/212 |
| 5,037,191 | 8/1991 | Cheng ................................... 359/869 |
| 5,039,184 | 8/1991 | Murakawa et al. ................... 259/216 |
| 5,216,247 | 6/1993 | Wang et al. ........................... 250/236 |

*Primary Examiner*—James Phan
*Attorney, Agent, or Firm*—John H. Kusmiss

[57] ABSTRACT

A scanning system uses a polygonal mirror assembly with each facet of the polygon having an ellipsoidal mirror located thereon. One focal point of each ellipsoidal mirror is located at a common point on the axis of rotation of the polygonal mirror assembly. As the mirror assembly rotates, a second focal point of the ellipsoidal mirrors traces out a scan line. The scanner can be utilized for scanned output display of information or for scanning information to be detected.

17 Claims, 9 Drawing Sheets

(PRIOR ART)

POINT RELAY SCANNER UTILIZING ELLIPSOIDAL MIRRORS

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The invention is directed to scanners, such as might be used in high speed projection of point sources onto an image plane, earth remote sensing, image scanning and projection, data display and the like. The invention is more particularly directed to scanners utilizing a polygonal mirror assembly which has an ellipsoidal mirror on each facet of the polygon.

2. Background Art

Scanners from the prior art encompass a wide variety of different designs. The scanners of the prior art generally require complex optics to ensure that the points being scanned are focused in a desired focal plane. This results in difficult and expensive design and in complex manufacturing requirements.

Prior art scanners typically experience some distortion and scan noise. It would be desirable to have a scanner which was free of such problems.

Heads-up helmet displays are utilized in the prior art to permit an operator, such as a pilot, to see information displays useful to operation of a vehicle without looking down at an instrument panel and while still perceiving the field of vision necessary to operate the vehicle.

Figure 1:
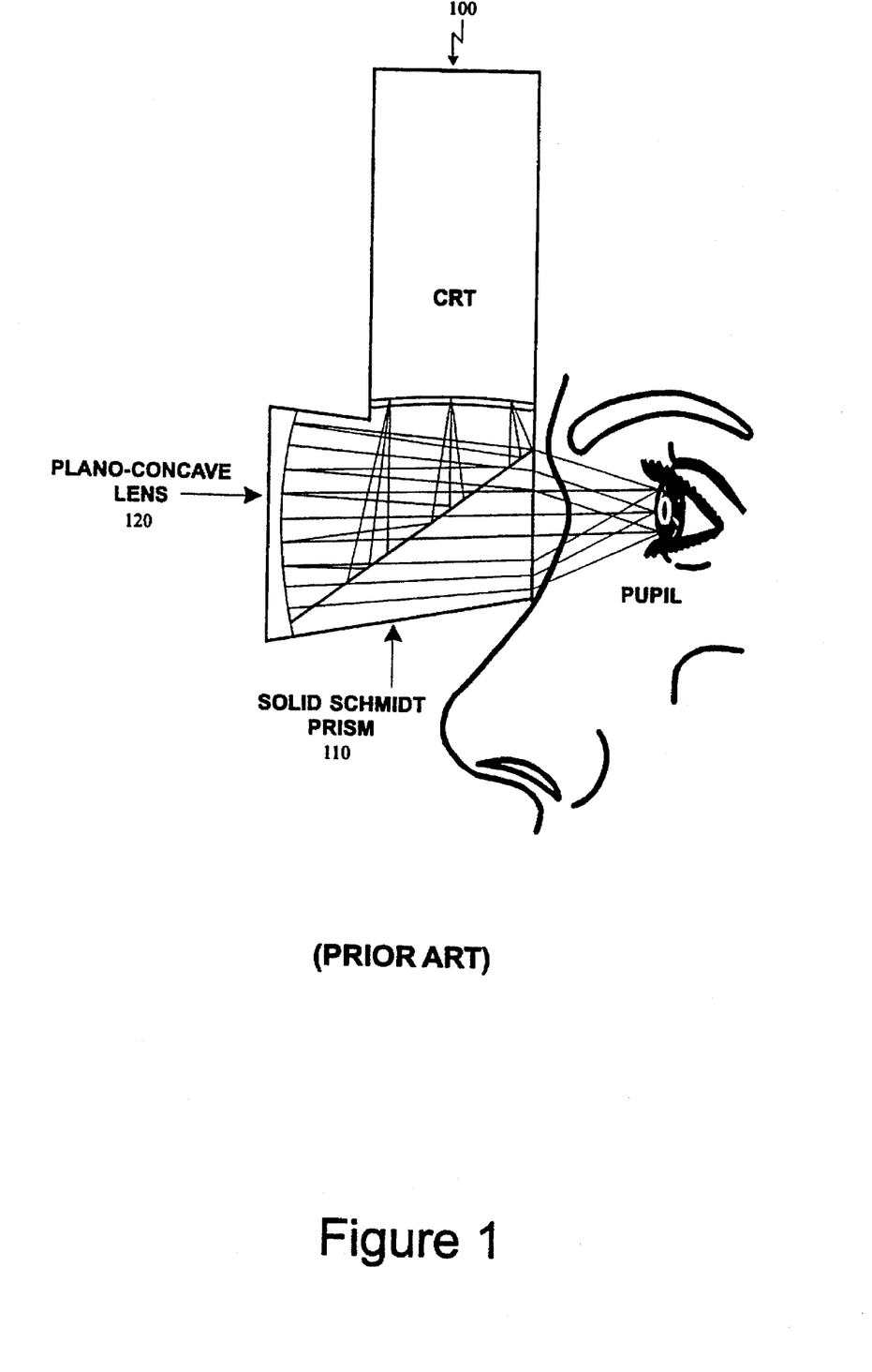
FIG. 1 is an illustration of a prior art heads up display.

Such heads-up displays can be implemented as shown in the example of FIG. 1. Image data to be displayed to the operator is generated at CRT 100 and reflected by the optics into the pupil of the operator's eye. As illustrated, the optics consist of a solid Schmidt prism 110 and a plano-concave lens 120. Light from outside the plano-concave lens 120 is transmitted through to the pupil of the eye so that the operator can see both the image projected by CRT 100 and the image originating outside the plano-concave lens 120.

STATEMENT OF THE INVENTION

The problems of prior art scanners are overcome by providing a scanner utilizing a unique polygon of concave ellipsoidal mirrors. The ellipsoidal mirrors rotate about an axis of rotation that contains one of its foci. The focal points of all mirrors lie on the axis of rotation at a common point. One or more point sources of light or other radiation to be relayed reside at this common point. The second of the two foci of the ellipsoid (conjugate to the first) rotates as the mirror assembly rotates with the ellipsoid sweeping out a predefined arc. The scanning focal point is a substantially perfect replica of the source point or points without distortion or scan noise. The invention can also work in reverse, by collecting energy emitted from a focal surface scanned by the second focus and then replicating that information at the first focus, where one or more detectors are located.

Accordingly, one advantage of the invention is to provide a scanner which will perfectly relay information to and/or from a focal point from/to a scanning focal surface without change in image quality, distortion or scan noise.

A further advantage of the invention is that it overcomes the distortion and scan noise problems of the prior art set forth above.

Yet another advantage of the invention is the provision of a heads up display which provides improved images to the viewer.

Still another advantage of the invention is the capability of mapping a point source onto a spherical geometry.

These and other advantages and objects of the invention are achieved by providing a mirror assembly with a polygonal base with a plurality of facets spaced about an axis of rotation. A plurality of ellipsoidal mirrors are mounted on the facets. Each has two focal points and each is mounted so that one focal point is located on the axis at a point common to focal points of all other mirrors.

The invention is also directed to a scanner having a mirror assembly with an axis of rotation and a plurality of mirrors each of which has two focal points. One of the focal points of each mirror is located at a common point on the axis. An optical element is also located at the common point and the mirror assembly is rotated about the axis of rotation to achieve scanning. The optical element can be either a source of radiation or a radiation detector.

If the optical element is a point source of radiation and it has a small numerical aperture, a dispersive material may be placed in the beam path to disperse the radiation into a larger numerical aperture. The radiation source may be monochromatic or color and the source may be modulated. An image of the point source is deflected in a scanning pattern by rotation of the mirror assembly. The scanning pattern may preferably follow a trace of second focal points of the mirrors if mirrors having two focal points, such as ellipsoidal mirrors, are used.

Two dimensional scanning may be achieved by deflecting the scanning pattern out of a plane of rotation of the second focal points. This may be done by mounting a mirror, preferably a flat mirror, to rotate about an axis and by incrementally rotating the mirror to deflect the scanning pattern to cause a plurality of parallel scan lines to be produced.

The invention is also directed to a method of combining scanning and focusing in a scanner by locating a radiation source or detector at a common focal point of a plurality of mirrors and by moving said mirrors so that said common focal point is unchanged and so that selected portions of an object to be scanned appear at said common focal point in focus.

The radiation source can be modulated or unmodulated, monochromatic or colored. If it is colored, the radiation source is preferably three colored light sources which are independently modulated. Precise location of a radiation source at a common focal point can be achieved using an optical fiber.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and several details are capable of modifications in various obvious respects, all without departing from the invention. Accordingly, the drawings and description are to be regarded as illustrative in nature, and not as restrictive.

DETAILED DESCRIPTION OF THE INVENTION

The invention makes use of ellipsoidal mirrors to achieve scanning. An ellipse is a two-dimensional curve defined by the equation:

$$\frac{x^2}{a^2} + \frac{y^2}{b^2} = 1 \qquad (1)$$

Figure 2:
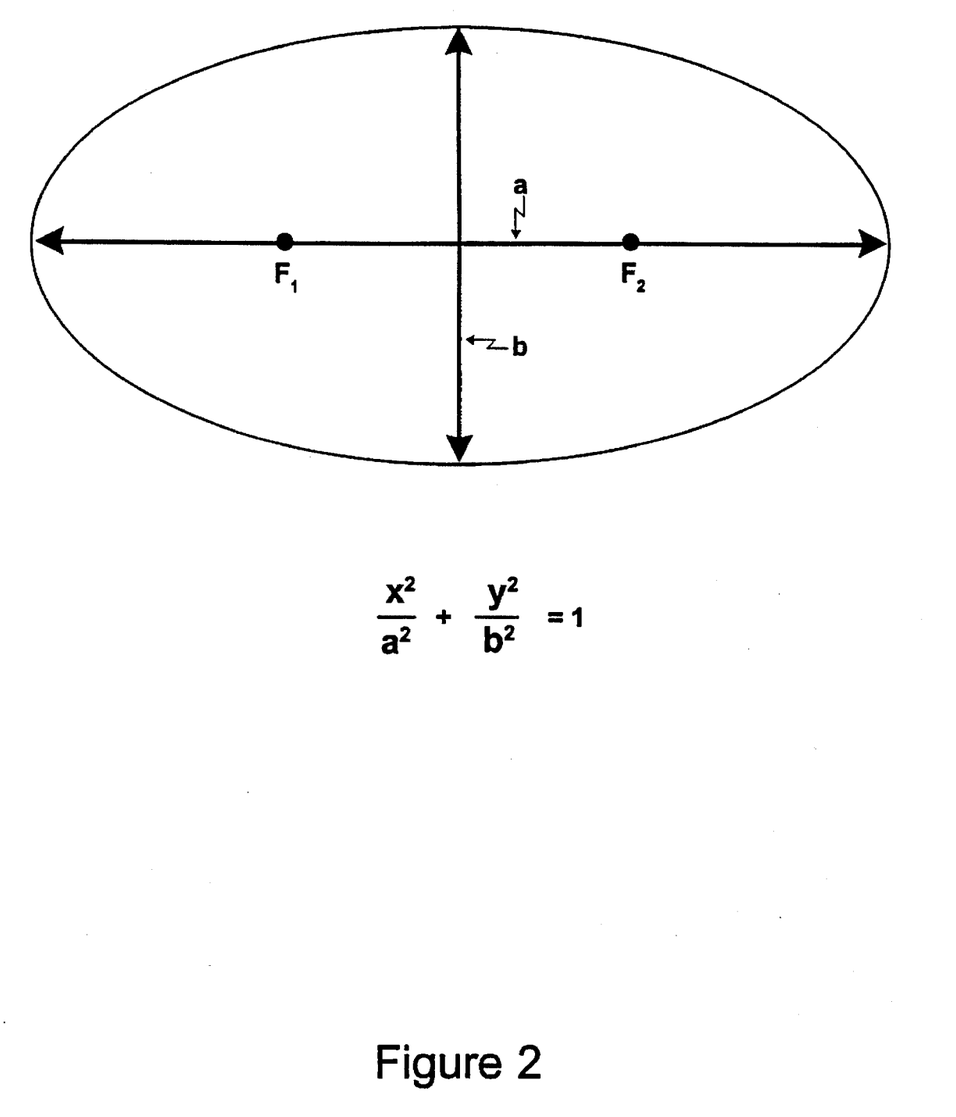
FIG. 2 is an illustration of an ellipse represented in rectangular coordinates.

As shown in FIG. 2, an ellipse has a major axis a and a minor axis b and two focal points, $f_1$ and $f_2$.

An ellipsoid is a three-dimensional object formed by the rotation of an ellipse about either of its axes. The invention uses ellipsoidal mirrors, that is mirrors whose reflective surfaces conform to the shape of an ellipsoid. If one could silver the inside of an ellipsoid of revolution a light source placed at focal point $f_1$ would be reflected from all inside surfaces of the ellipsoid and be concentrated again at focal point $f_2$. Similarly, if a source were placed at $f_2$, the light would be focused at focal point $f_1$. This particular characteristic of an ellipsoid of revolution provides considerable advantages when constructing a scanner as more fully set forth hereinafter.

Figure 3:
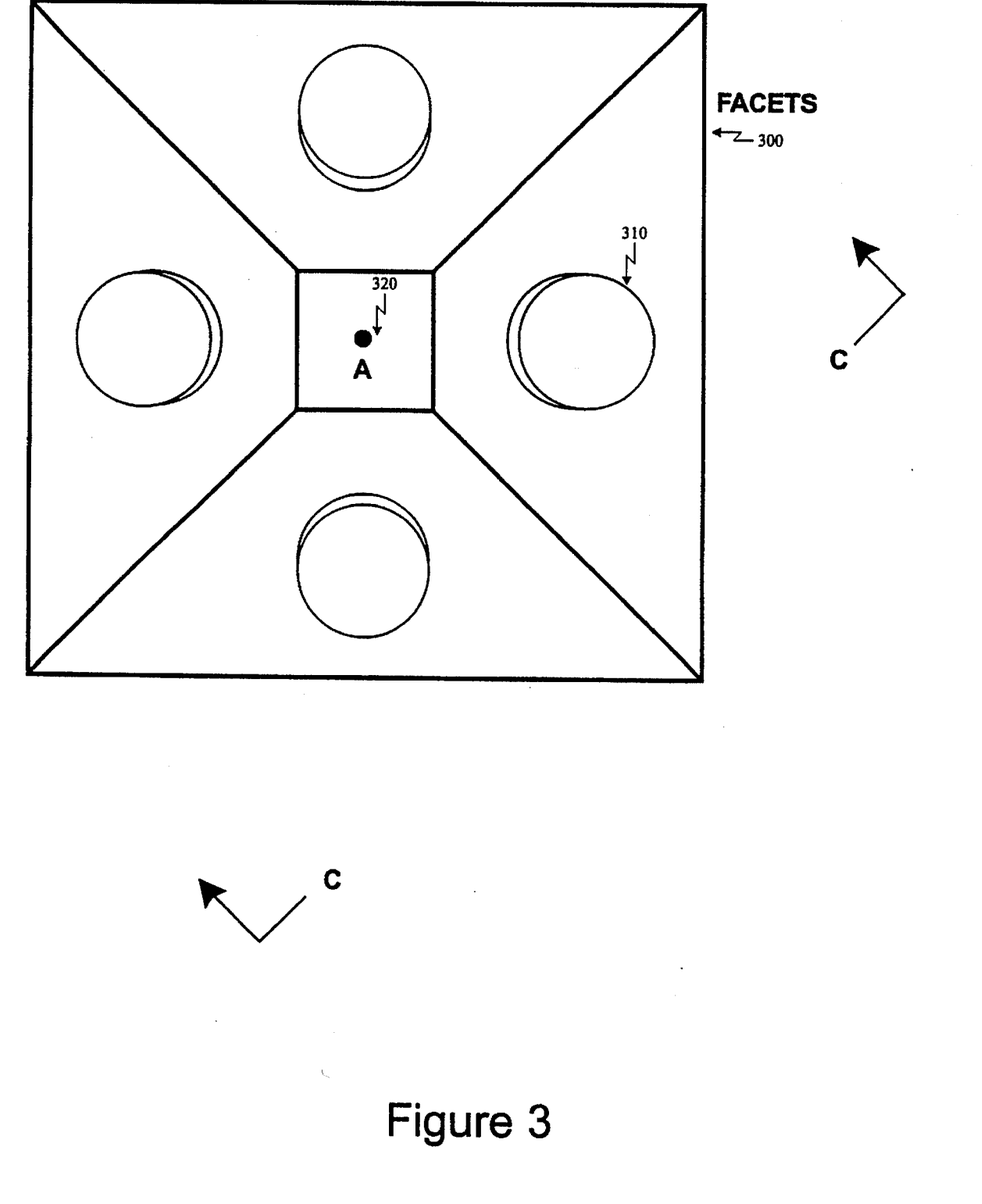
FIG. 3 is a top view of a mirror assembly in accordance with the invention.
Figure 4:
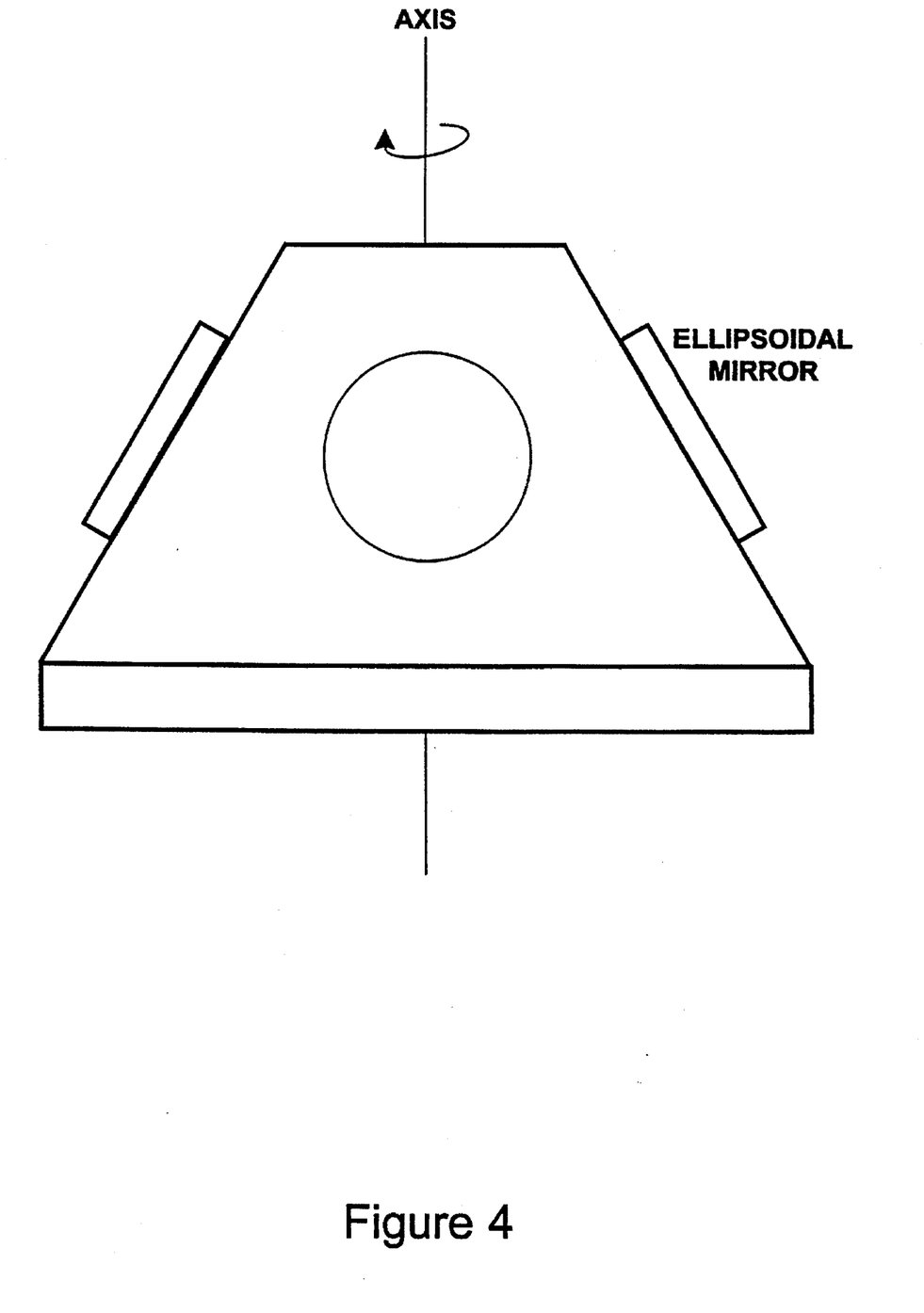
FIG. 4 is a side view of the mirror assembly of FIG. 2.

FIGS. 3 and 4 show top and side views respectively of a polygonal mirror assembly. The mirror assembly of FIGS. 3 and 4 has a base comprising N facets uniformly angularly spaced about an axis 320. The number of facets utilized corresponds to the number N of the sides of the polygon. Each facet has mounted thereon, or formed in the surface thereof, an ellipsoidal mirror 310 for use in scanning as indicated hereinafter. The mirror assembly rotates about axis A (320) when scanning. Although only four facets are shown in FIGS. 3 and 4, the number of facets, N, is arbitrary, although N=4 and N=8 are preferred.

Figure 5:
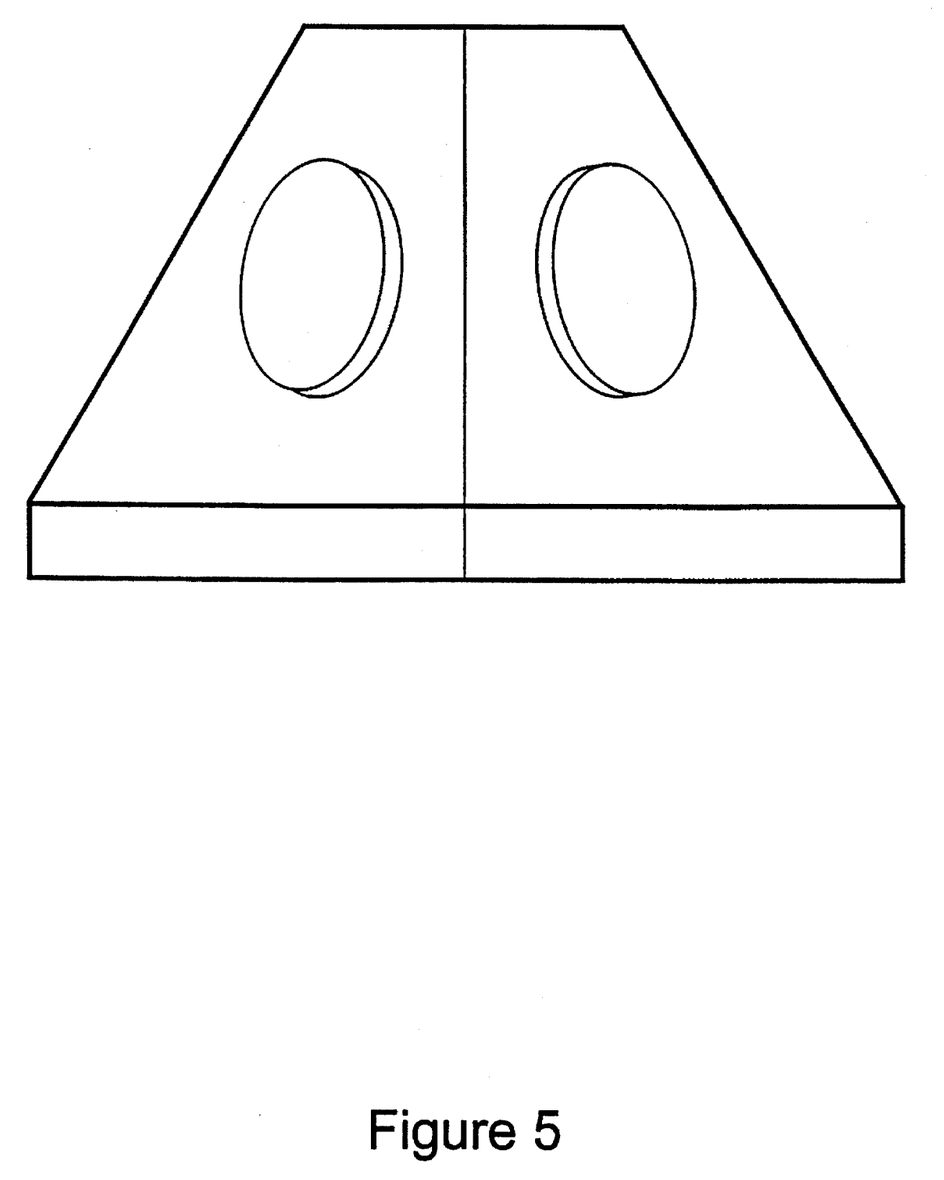
FIG. 5 is a view from perspective C—C of the mirror assembly of FIG. 3.

FIG. 5 illustrates a view of the mirror assembly from the perspective C—C.

Figure 6:
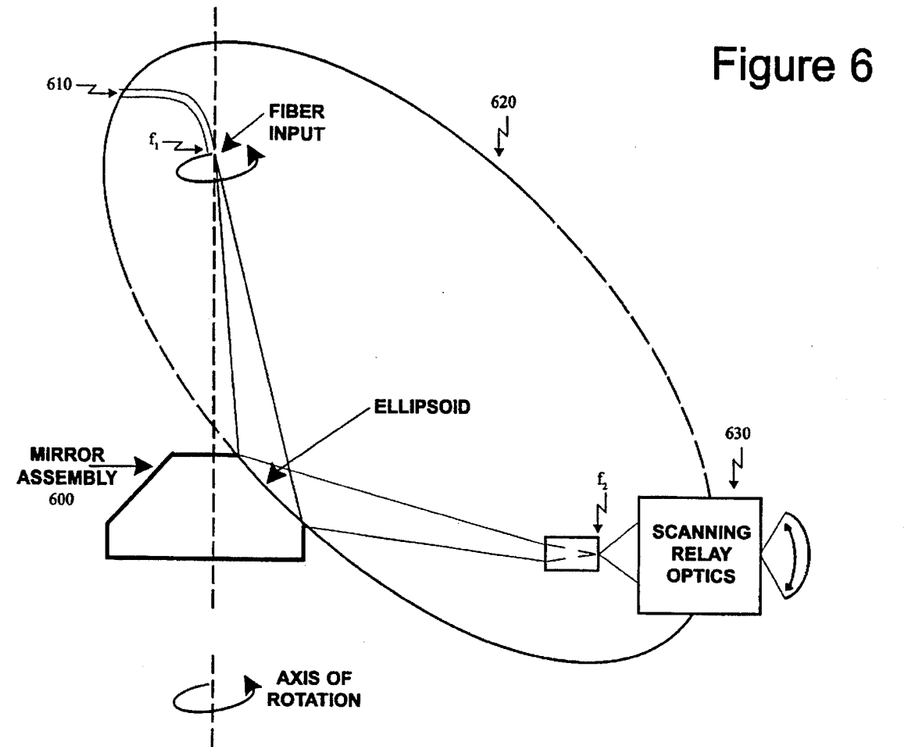
FIG. 6 is an illustration of an embodiment of the invention which uses the mirror assembly of FIG. 3 in a scanning system (side view).
Figure 7:
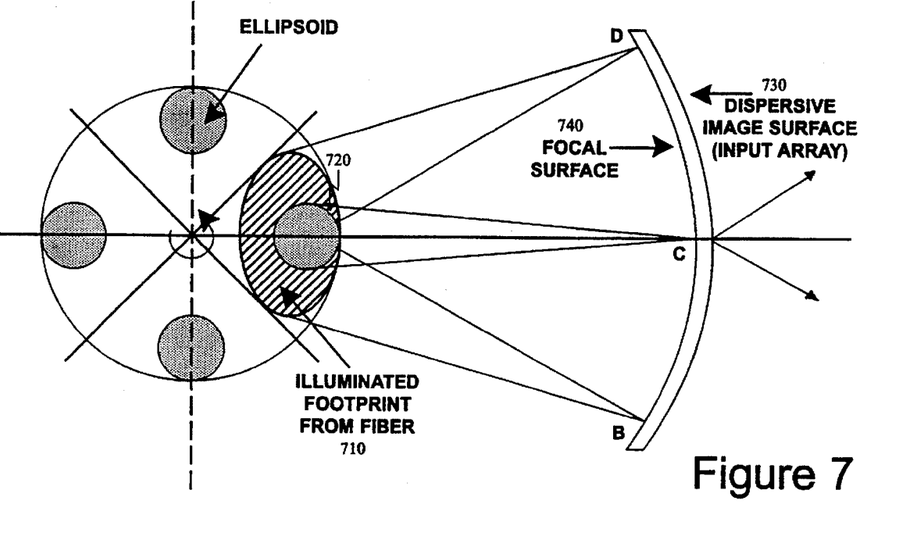
FIG. 7 is an illustration of an embodiment of the invention using the mirror assembly of FIG. 3 in a scanning system (top view).

FIGS. 6 and 7 illustrate operation of a scanner in accordance with the invention in an active mode, that is one in which light or other radiation from a point source $f_1$ is to be scanned across a focal surface, such as the display screen 730 of a display device. As shown in FIG. 6, each of the ellipsoidal mirrors is mounted on the mirror assembly such that one focal point of each of the mirrors is located at a common point on the axis of rotation of the mirror assembly. That common point is identified as $f_1$ in FIG. 6. An optical fiber 610 or other source of radiation is placed with its output at the common focal point $f_1$ of the mirror assembly. Optical fiber 610 is designed to have an illuminated footprint 710, shown in FIG. 7, on the surface of the mirror assembly such that it encompasses mirror 720 as mirror 720 rotates through the illuminated footprint. In the event that the numerical aperture of the optical fiber is smaller than desired, dispersive material may be placed between the fiber and the focal point, thereby increasing the size of the footprint of illumination in the vicinity of the scan mirrors. As shown in FIG. 6, a light source located at $f_1$ will be focused by virtue of the ellipsoidal mirror at focal point $f_2$ of the mirror. As the mirror assembly 600 rotates, the focal point $f_2$ traces an arc through space as shown in FIG. 7, progressively moving from point B to point C to point D on dispersive image surface 730. Although focal point $f_2$ moves, common focal point $f_1$ does not move because it is located substantially on the axis of rotation, so that the output of optical fiber 610 is always located at common focal point $f_1$.

The ellipse 620 shown in FIG. 6 is shown for reference purposes only to illustrate the relationship between the focal points of the ellipsoidal mirrors of the mirror assembly, the optical source, and the image plane.

Scanning relay optics 630, shown in FIG. 6, represent relay optics such as those depicted in FIG. 1 as a solid Schmidt prism and plano-concave lens. These will be discussed more hereinafter.

In FIG. 7, the focal plane is illustrated as formed on the inner surface of a dispersive image medium 730. As ellipsoidal mirror 720 scans from point B to point C to point D in a continuous fashion, the intensity of the radiation emanating from optical fiber 610 can be modulated either in intensity or in an on-off fashion to provide the desired output on the screen.

Optical fiber 610 may comprise one or more optical fibers comprising a point source of radiation or a collection point for radiation. One should observe that the output of each optical fiber 610 may be monochromatic or in color. If in color, preferably, independent red, green, and blue light sources would be utilized to provide the instantaneously desired output color for projection on to the display screen 730 of FIG. 7.

The scanner illustrated in FIGS. 6 and 7 can also operate in a passive mode, in which a detector is coupled to the focal point $f_1$ by, for example, an optical fiber and radiation from an image formed on focal surface 740 is reflected by ellipsoidal mirror 720 to focal point $f_1$ as the mirror assembly rotates. This allows the detector to sense the amount of radiation coming from the focal surface at the instantaneous location of focal point $f_2$. This can then be converted into an electrical signal for processing in the usual manner. If the output of the optical fiber at the focal point $f_1$ is chopped into time segments, one time segment can be allocated to each pixel of a scan so that pixel-by-pixel scanning can be produced on the display screen. Similarly, in the reverse direction, when a detector is located at the common focal point $f_1$, a shutter can provide pixel-by-pixel detection of the scanned image. Such a shutter can be accomplished by an electrical function, an optical function, or an electro-optical function.

Figure 8:
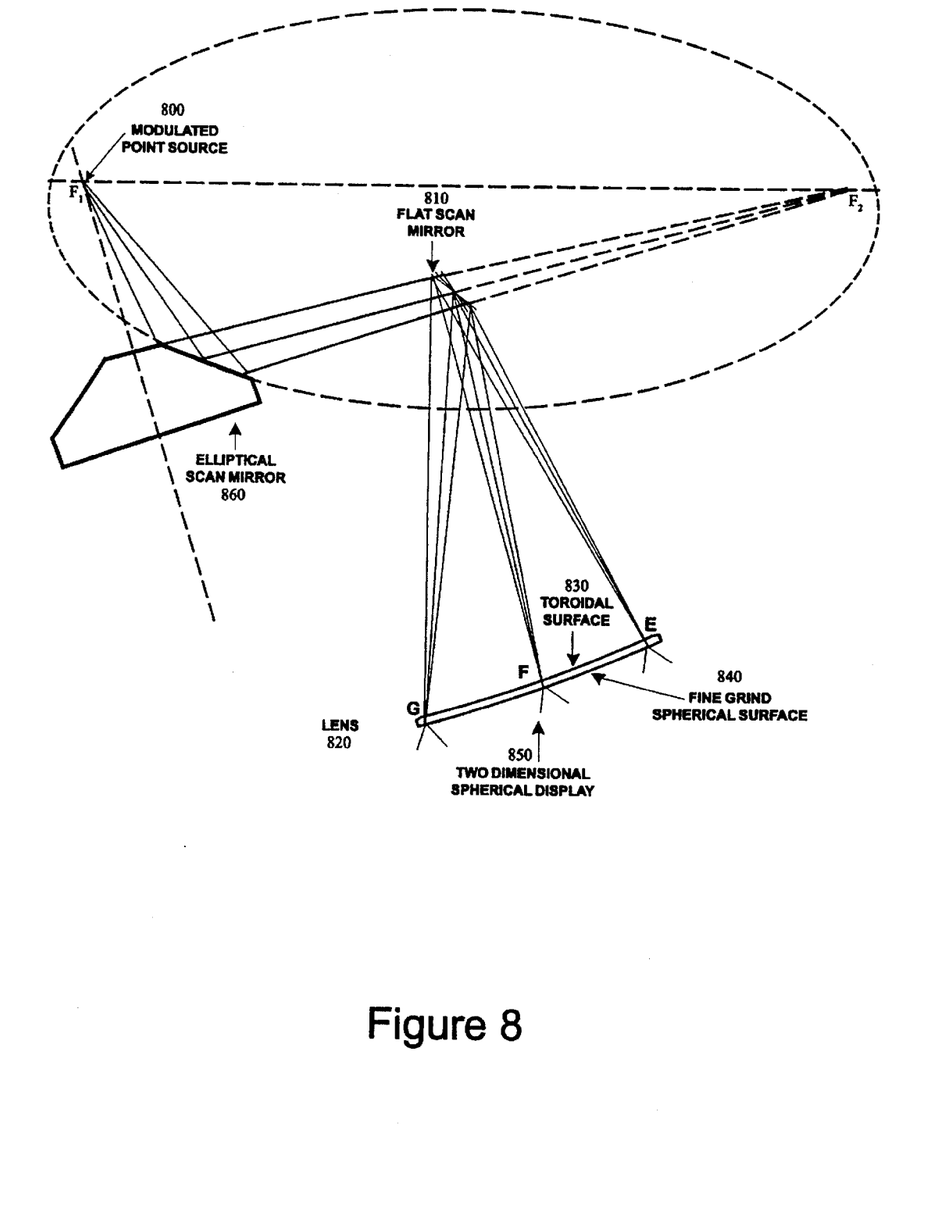
FIG. 8 is an illustration of a second embodiment of the invention used for two-dimensional scanning.

FIG. 8 illustrates an extension of the scanner described thus far to two-dimensional scanning. Instead of placing the focal surface at the curve traced by focal point $f_2$, the light from the rotating ellipsoidal mirrors is intercepted by flat scan mirror 810 and controllably deflected onto lens 820 which forms a two-dimensional spherical display 850. The inner surface of lens 820 is toroidal to correct for curvature differences resulting from the scanning. The outer surface 840 is preferably spherical in shape and finely ground. As the elliptical scan mirror 860 rotates about its axis, radiation from modulated point source 800 at focal point $f_1$ is reflected by elliptical scan mirrors which cause focal points $f_2$ to rotate through space as shown in FIG. 7, progressing from points B to C to D. However, before the light or other radiation can reach focal point $f_2$ as shown in FIG. 8, flat scan mirror 810 interrupts the converging beam and deflects it downward onto toroidal surface 830. Initially, flat scan mirror 810 is located to direct the beam to one extreme such as point E, and with scan mirror 810 positioned in that orientation, a complete scan line is formed in along a direction generally normal to the plane of the image, progressing from points B to C to D shown in FIG. 7. Flat scan mirror 810 is then incremented downward so that the next scan line is formed somewhere between points E and F in FIG. 7. As each scan line is completed, the deflected beam from the ellipsoidal scan mirrors 810 is deflected by flat scan mirror incrementally in one direction so that a plurality of horizontal lines are formed in a perpendicular direction, with the displacement progressing from point E through point F finally to point G of FIG. 8. At the end of the two-dimensional scan, the flat scan mirror will be displaced, if necessary, to the point where the scanning of the next image or frame will begin.

Figure 9:
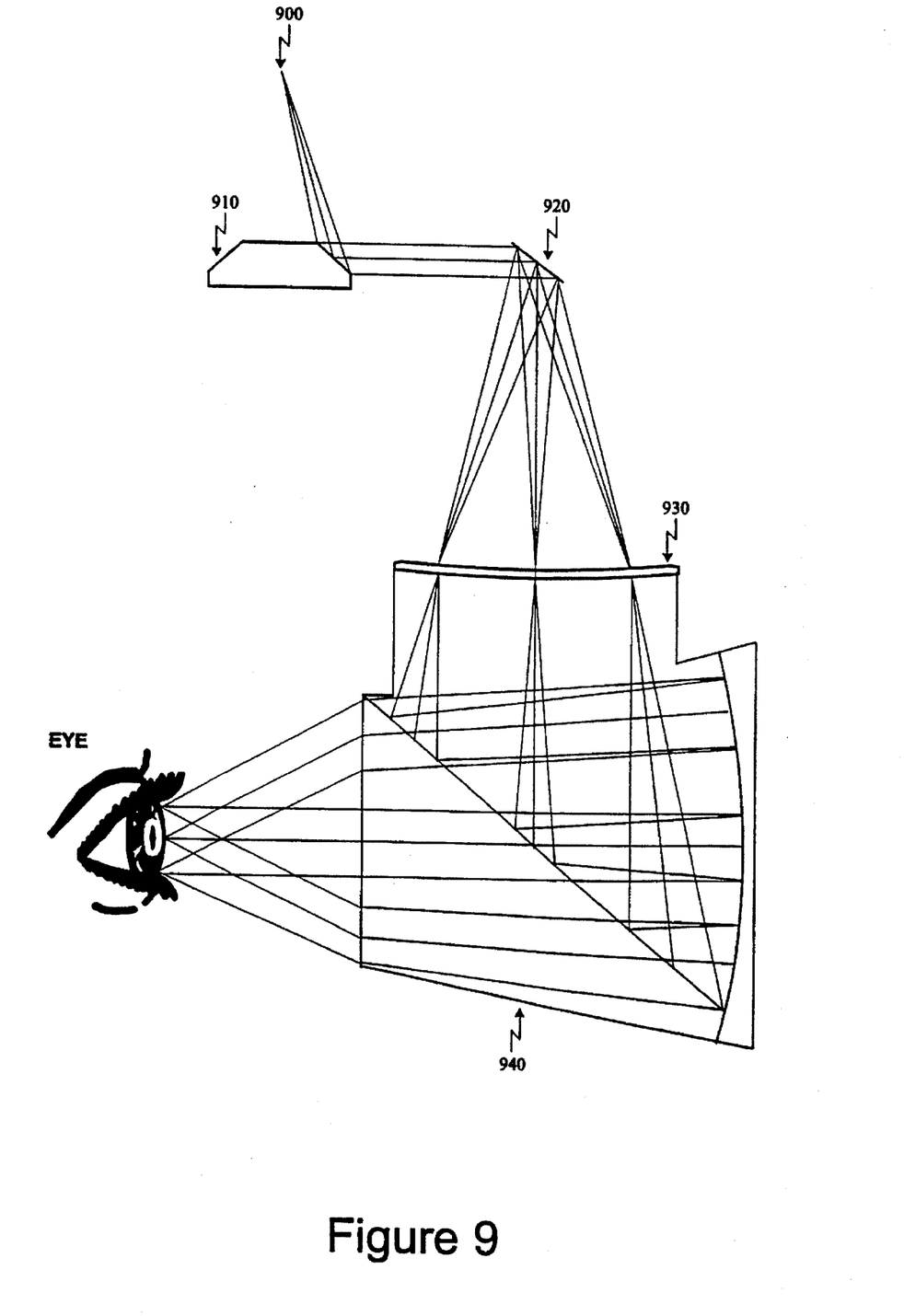
FIG. 9 is an illustration of a scanning assembly of FIG. 8 incorporated into a head-up display of the type shown in FIG. 1, replacing the CRT.

FIG. 9 illustrates the use of a rotating ellipsoidal mirror scanner as described in conjunction with FIG. 8 in a heads-up display. Point 900 represents the common focal point on the rotating axis of the mirror assembly 910. Flat scan mirror 920 corresponds to flat scan mirror 810 of FIG. 8 and display 930 corresponds to lens 820 of FIG. 8. Item 940 labels the combined solid Schmidt prism 110 and plano-concave lens 120 (relay optics) of FIG. 1 utilized to project the scanned image from display surface 930 to the eye of the operator. The optics are arranged such that the image projected by the scanning assembly is focused at infinity for the operator's eye.

Figure 10:
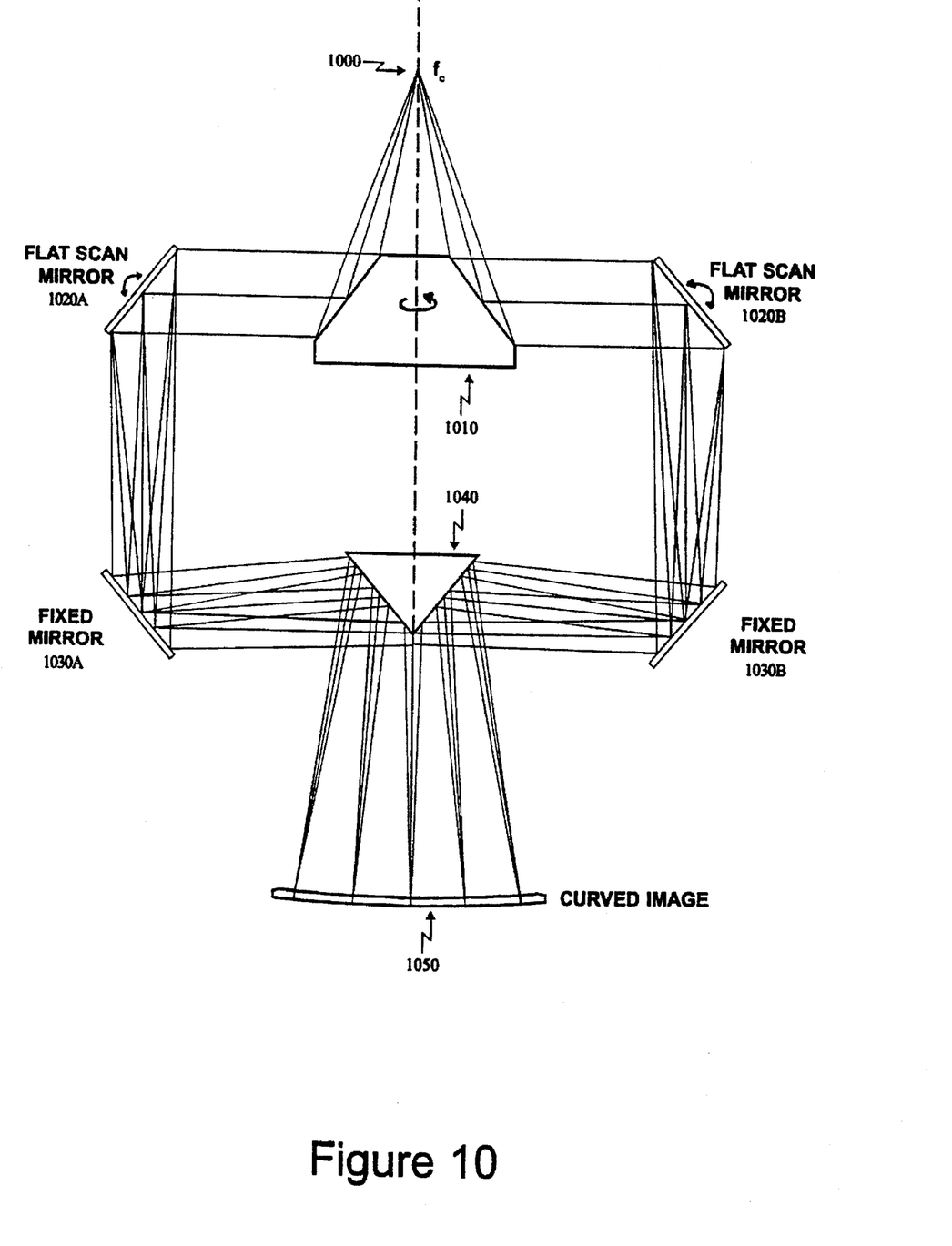
FIG. 10 is an illustration of another embodiment of the invention utilizing simultaneous dual path scanning.

FIG. 10 illustrates another embodiment of the invention. In this embodiment, two point sources are located at common focal point 1000, each projecting light or other radiation onto different sides of the rotating assembly 1010. Two flat scan mirrors 1020A and 1020B incrementally deflect the scan lines onto respective fixed mirrors 1030A and 1030B. The reflections from fixed mirrors 1030A and 1030B are reflected by opposite sides of fixed prism 1040 onto the display surface 1050. Display surface 1050 corresponds to lens 820 of FIG. 8.

In this arrangement, light from one point source provides scanning information for half of the image and light from the other point source provides scanning information for the other half. Since flat scan mirrors 1020A and 1020B can be independently controlled, the order of the scanning of each half of the image may proceed independently from that of the other half. This approach is particularly simplified when a video buffer is utilized and information from the two halves of the buffered image to be projected utilizing the arrangement of FIG. 10 are read out independently and provided to point sources located at 1000 in an order which corresponds to the desired scanning pattern of the flat scan mirrors 1020A and 1020B.

There has accordingly been described a mirror assembly, scanning system and heads up display which overcome the problems associated with prior-art scanners by using the conjugate focal points of a concave ellipsoidal mirror system to achieve high-efficiency scanning without distortion or scan noise.

In this disclosure, there has been shown and described only the preferred embodiment of the invention, but as aforementioned, it is to be understood that the invention is capable of use in various other combinations and environments, and is capable of changes or modifications within the scope of the inventive concept as expressed herein.

What is claimed is:

1. A scanner comprising:
    a. a mirror assembly having an axis of rotation and a plurality of mirrors each having two focal points with one of said two focal points located at a common point on said axis of rotation;
    b. one or more optical element located at said common point; and
    c. means for rotating said mirror assembly about said axis of rotation.

2. The scanner of claim 1 in which said optical element is a point source of radiation.

3. The scanner of claim 2 in which said point source of radiation has a small numerical aperture and dispersive material is placed in the beam path to disperse the radiation into a larger numerical aperture.

4. The scanner of claim 2 in which said point source of radiation is modulated.

5. The scanner of claim 2 in which radiation from said point source is deflected in a scanning pattern by rotation of said mirror assembly.

6. The scanner of claim 5 in which the scanning pattern follows a trace of second focal points of said mirrors as said mirror assembly rotates.

7. The scanner of claim 6 further comprising a scan mirror for deflecting said scanning pattern out of a plane of rotation of said second focal points.

8. The scanner of claim 7 in which the scan mirror incrementally deflects said scanning pattern to cause a plurality of parallel scan lines to be produced thus permitting scanning in two dimensions.

9. The scanner of claim 8 in which said scan mirror comprises a flat mirror mounted to rotate about a mirror axis and means for incrementally rotating said mirror about said mirror axis.

10. The beam scanner of claim 1 in which said optical element is a detector of radiation.

11. A method of combining scanning and focusing in a scanner, comprising:
    locating a radiation source or detector at a common focal point of a plurality of mirrors;
    moving said mirrors so that said common focal point is unchanged and so that a second focal point of each of said plurality of mirrors traces a scanning pattern.

12. The method of claim 11 in which said radiation source comprises one or more optical fibers.

13. The method of claim 11 in which said radiation source is modulated.

14. The method of claim 11 in which said radiation source comprises three colored light sources.

15. The method of claim 14 in which said three colored light sources are independently modulated.

16. The method of claim 11 in which said radiation source is monochromatic.

17. A heads-up display comprising:
    a. A scanner having a mirror assembly with an axis of rotation and a plurality of mirrors each having two focal points with one of said two focal points located at a common point on said axis of rotation, an optical source located at said common point and means for rotating said mirror assembly about said axis of rotation, b. a scan mirror incrementally deflecting light reflected from said optical source by said mirror assembly onto a display screen, and c. scanning relay optics for coupling images from said display screen and from another source into a position where said images may be simultaneously viewed by a user.

* * * * *